Jan. 25, 1944. H. S. JONES 2,340,126
CONTROL APPARATUS
Filed Nov. 8, 1940 3 Sheets-Sheet 1

INVENTOR.
HARRY S. JONES
BY C. O. Spangenberg
ATTORNEY

Jan. 25, 1944.  H. S. JONES  2,340,126
CONTROL APPARATUS
Filed Nov. 8, 1940  3 Sheets-Sheet 2

INVENTOR.
HARRY S. JONES
BY C. B. Spangenberg
ATTORNEY

Patented Jan. 25, 1944

2,340,126

UNITED STATES PATENT OFFICE 2,340,126

CONTROL APPARATUS

Harry S. Jones, Philadelphia, Pa., assignor to The Brown Instrument Company, Philadelphia, Pa., a corporation of Pennsylvania Application November 8, 1940, Serial No. 364,880

8 Claims. (Cl. 236—74)

The present invention relates to automatic electrical systems for measuring and/or controlling the magnitude or changes in magnitude of a variable condition.

An object of the invention is to provide control apparatus, including means responsive to a condition, in which safety provisions are incorporated to modify the control upon failure of the condition responsive means.

Another object of the invention is to provide such a supervisory control system which is continuously responsive to derangement or failure of the condition responsive means.

A specific object of the invention is to provide a supervisory control system to detect the derangement or failure of a thermocouple, which system operates in accordance with the impedance to the flow of alternating current of a circuit including the impedance of the thermocouple. A further object of the invention is to provide such a supervisory control system which is insensitive to the presence of stray alternating currents in said circuit due to inductive interference, or other causes.

Another specific object of the invention is to provide a supervisory control system responsive to thermocouple derangement or failure, which system is adapted to respond to effect a desired supervisory control action when the thermocouple impedance increases only slightly above a predetermined maximum value.

A further specific object of the invention is to provide, in a circuit including a thermocouple and a direct current measuing instrument, means for producing a flow of alternating current of great enough magnitude to provide a measure of the impedance of said circuit and thereby to effect a supervisory control action, and small enough under normal conditions of operation to avoid undesirable effects on the operation of the measuring instrument.

A further specific object of the invention is to provide a supervisory control system responsive to thermocouple derangement or failure which can be incorporated in existing measuring and/or controlling systems without disturbing the calibration of the latter.

The arrangement of my present invention is particularly adapted for application to control systems utilizing the null method of measuring a condition to be controlled, that is to say, to control systems in which the circuit for measuring or indicating the condition to be controlled is repeatedly rebalanced and in which the movement of the associated rebalancing apparatus is utilized as a measure of the condition under control. In such systems the failure of certain elements of the measuring circuit results in a complete loss of control of the condition by the control system, under which circumstances the condition under control may assume excessive or destructive values. For example, when the control system is being used to control the supply of heat to a process in response to variations in temperature of the latter, as measured by a thermocouple subjected to the temperature of the process and adapted to control the state of balance of a null type measuring circuit, failure or open circuiting of the thermocouple renders the measuring circuit unresponsive to changes in the temperature of the process and consequently results in loss of control of the temperature of the process by the control system. Under such condition, heating agent will be supplied to the process irrespective of the temperature thereof. As a result the process is permitted to reach an excessive temperature which may cause considerable damage to the work being processed and also to the furnace.

In the prior art, supervisory control systems have been proposed wherein failure or open circuiting of a thermocouple is detected by measuring the impedance to the flow of alternating current of a test circuit including the thermocouple. The test circuits, in such prior art arrangements, invariably are connected in parallel with the measuring circuit of the control system and in order to test for failure or open circuiting of the thermocouple, provisions are made for intermittently opening the measuring circuit. During the intervals when the measuring circuit is open, the test circuit is completed solely by the thermocouple so that open circuiting of the latter is readily detected. During such test intervals, however, the measuring circuit is unresponsive to variations in the temperature to which the thermocouple is subjected, and therefore, loss of control of the condition by the control system is experienced. Furthermore, if failure or open circuiting of the thermocouple should occur during an alternate interval when the measuring circuit is closed, the control system is rendered unresponsive to temperature changes, and accordingly, heating agent is supplied irrespective of the temperature of the process. This requires that the intervals between the test intervals be extremely short in order to guard against the establishment of an excessive and destructive temperature, and therefore, frequent disturbance of the measuring circuit.

These defects of the prior art arrangements have been avoided in accordance with my present invention by eliminating the necessity of disturbing the measuring circuit, that is to say, dispensing with the use of an interrupter or a like device for the measuring circuit and thus making the control system continuously responsive to the temperature of the thermocouple and also continuously responsive to failure thereof.

The supervisory control systems of the prior art moreover, have responded only to complete failure of the thermocouple, that is, an open circuit thereof. In accordance with my invention the circuit elements may be so proportioned that a supervisory control action in response to any value of thermocouple resistance above a predetermined maximum resistance is obtained. Cases of incipient thermocouple failure may therefore be detected before complete failure occurs.

The supervisory control system of my present invention is further characterized by the fact that it can be added to existing control applications without disturbing the calibration of the latter. Because of this, the supervisory control apparatus of my invention may be connected in the lead wires between a thermocouple and a self balancing potentiometric measuring instrument, for example, without affecting the normal operation of the latter. This feature is believed to be novel with me and is believed to have considerable commercial importance.

The supervisory control system of my present invention is further characterized by the fact that it may be readily adapted for use in applications where it is desired only to give an alarm and effect discontinuance of the control by the system upon thermocouple failure, or to applications wherein it is desired to operate the control system to cut off the supply of heat upon such failure.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
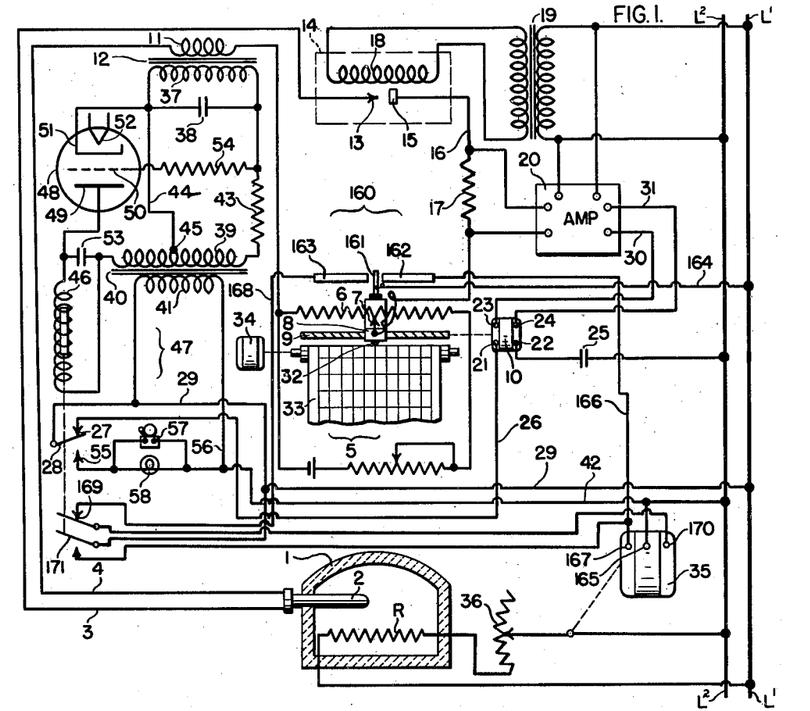
Fig. 1 illustrates diagrammatically an automatic temperature control system provided with a supervisory control system in accordance with my invention.

In Fig. 1 I have shown a furnace 1, in which a thermocouple 2 is inserted so that it may develop an E. M. F. proportional to the temperature therein. Heat is supplied to the furnace 1 by a heating resistor R, and the current flow through the latter is controlled by means to be described hereinafter in accordance with the E. M. F. developed by the thermocouple 2.

The thermocouple, which may be located at a distance from the measuring and controlling apparatus, has its terminals connected by a pair of conductors 3 and 4 to the terminals of a null point potentiometric network 5. The network 5 includes a slidewire resistance 6 and an associated contact 7, the latter of which is adapted to be moved along the length of the slidewire, and may be of any suitable type, for example, such as the Brown potentiometric network disclosed in Patent 1,898,124 issued to Thomas R. Harrison, February 21, 1933.

The movable contact 7 of the potentiometer is attached to a suitable carrier which, for example, may be in the form of an internally threaded nut 8 adapted to ride on a screw threaded rod 9 which is rotated in one direction or the other under control of the thermocouple 2. A reversible motor 10 is coupled in any convenient manner to the screw threaded rod 9 to rotate the latter and thereby to move contact 7 along the slidewire 6 to rebalance the potentiometer when the latter is unbalanced.

One terminal of the thermocouple 2 is connected by the conductor 4, in which the secondary winding 11 of a transformer 12 is inserted, to the left end of the slidewire 6, as seen in the drawings, and the other terminal of the thermocouple is connected by the conductor 3 to one contact 13 of an interrupter or converting device 14. A second contact 15 of the interrupter is connected by a conductor 16, in which a resistor 17 is inserted, to the contact 7.

The interrupter 13 operates to convert the direct currents resulting from unbalance of the potentiometric network 5 into pulsating currents capable of being readily amplified. Any desired form of interrupter may be used. The contacts 13 and 15 of the interrupter shown are opened and closed by a winding 18 which is energized, through an isolating transformer 19, from alternating current supply lines L¹ and L². Upon energization of winding 18, contacts 13 and 15 will be alternately opened and closed, thus intermittently breaking the circuit. The winding 18 may desirably be polarized so that the circuit will be interrupted at supply line frequency.

The periodic interruption of the current which flows in the potentiometric network 5 when an unbalanced condition obtains produces a pulsating potential drop across the resistance 17. This potential drop is either in phase with the supply line voltage or displaced in phase 180° therefrom, depending upon the direction of current flow in the potentiometric network, and consequently, upon the direction of deviation of the temperature of furnace 1 from the desired value. This potential drop is impressed on the input terminals of an electronic amplifier 20, wherein it is amplified, and the amplified quantity is applied to the terminals of the reversible motor 10.

The motor 10 is provided with three separate windings (not shown) having a common terminal 21, and opposite terminals 22, 23, and 24, respectively. All the terminals are accessible from the exterior of the motor. The first of these windings is connected between terminals 21 and 22 and is energized from supply lines L¹ and L² through a circuit which may be traced from line L², through a condenser 25, terminal 22, the motor winding, terminal 21, a conductor 26, a contact 27, a switch arm 28, and a conductor 29 to line L¹. When switch arm 28 engages contact 27, as it normally does when the system is in operation, the first motor winding is energized, and the current flow through it, due to the presence of condenser 25, is displaced substantially 90° in phase from the line voltage. The second and third motor windings are connected between the common terminal 21 and terminals 23 and 24, respectively. The energizing circuit for the second winding may be traced from line L², through amplifier 20, a conductor 30, terminal 23, the second motor winding, terminal 21, and thence along the last-described circuit to line L¹. The energizing circuit for the third motor winding may be similarly traced from line L² through amplifier 20, a conductor 31, terminal 24, the third motor winding, and terminal 21 to line L¹.

The amplifier 20 transmits energy to the second motor winding through conductor 30 when the pulsating potential impressed across its input circuit is in phase with the line voltage, and transmits energy to the third motor winding through conductor 31 when the input potential is 180° out of phase with the line voltage. When the first winding alone is energized, no torque is transmitted to the rotor of motor 10. When the first and second windings are energized, the reaction of their magnetic fields produces a torque tending to rotate the rotor of motor 10 in one direction, and when the first and third windings are energized, a torque is produced tending to rotate the rotor in the opposite direction. It may be seen, therefore, that the motor 10 responds to a change in the E. M. F. developed by thermocouple 2 by moving the contact 7 along the slidewire 6 in the proper direction to rebalance the potentiometric network 5.

If desired, a pen 32 may be mounted on the carriage 8 which carries the contact 7 and arranged in cooperative relation with a recorder chart 33 to provide thereby a continuous record of the temperature of the furnace 1 in which the thermocouple 2 is inserted. The chart 33 may be a strip chart, as shown, and may be driven in any convenient manner, as by a unidirectional motor 34 through suitable gearing (not shown), so that a record of the temperature to which the thermocouple 2 is subjected will be recorded as a continuous line on the chart.

It will be apparent that the supply of heating agent to the furnace 1 may be controlled in accordance with the deflections of the pen 32 along the chart 33. For example, a reversible electrical motor 35 having two opposed field windings (not shown) may be utilized to adjust a rheostat 36, which controls the flow of electrical current from the alternating current supply lines L¹ and L² through a heating resistor located within the furnace 1, in response to the deflections of pen 32. The mechanical connection of the rheostat 36 is such as to increase and decrease the supply of electric current through the heating resistor R as the furnace temperature rises above or falls below a predetermined level.

To this end the reversible motor 35 is energized for rotation in one direction or the other depending upon the direction of deflection of the pen 32 from a predetermined position along the chart 33. Specifically, a switch 160, which is actuated in accordance with the adjustments of the pen 32, is provided for controlling the energization of the motor 35. The switch 160 includes a switch arm 161, which is insulated from but is carried by the same support as contact 7, and also includes elongated contact segments 162 and 163 which are disposed on opposite sides of the arm 161. The switch arm 161 is connected by a conductor 164 to the alternating current supply line L¹. The contact segment 162 is connected by a conductor 166 to one terminal 167 of one motor winding and the contact segment 163 is connected by a conductor 168 in which a switch 169 is inserted, to one terminal 170 of the other motor winding.

The switch 169 is closed during the normal operation of the system. The terminal 165 on motor 35 is common to both windings of the motor and is connected by conductor 42 to the supply line L². As shown, the terminal 167 of the first mentioned motor winding is connected through a switch 171 to the alternating current supply line L¹. During the normal operation of the system the switch 171 is open. The switches 169 and 171 are controlled by the relay 47. Their function in the control system is explained hereinafter.

With the connections described, when the arm 161 is in engagement with the contact segment 162, the first mentioned winding is energized for rotation in the direction to effect a reduction in the supply of electrical current to the heating resistor R, and when the arm 161 is in engagement with the contact segment 163 the motor 35 is energized for rotation in the direction to effect an increase in the supply of current to the heating resistor R.

Although not shown, the contact segments 162 and 163 of the switch 160 are desirably made adjustable relatively to each other and to the chart 33 so that both the control point setting and the sensitivity of the apparatus may be adjusted in a manner well known in the art.

The secondary winding 11 of the transformer 12, which is connected in the conductor 4, has only a few turns, and hence presents a very low impedance to the flow of current in the potentiometer circuit. Since this is the only element which need be inserted in the measuring circuit of an existing system in order to use the present invention, it is apparent that the calibration of the measuring circuit will not be appreciably disturbed. Furthermore, the alternating current produced in the measuring circuit by this transformer is very low, being of the order of 1.0 milliampere, so that its effect on the measuring circuit is insignificant for all practical purposes. The transformer 12 has a primary winding 37 of high impedance which is shunted by a tuning condenser 38. Primary winding 37 is energized from the secondary winding 39 of a transformer 40 having a primary winding 41 energized from supply lines L¹ and L² through conductors 42 and 29. The circuit from secondary winding 39 of transformer 40 to primary winding 37 of transformer 12 may be traced from the right hand terminal of winding 39, as it appears in the drawings, through a resistor 43, winding 37, and a conductor 44 back to an intermediate tap 45 on winding 39. Winding 39 also serves to energize a winding 46 of a relay 47 through a circuit controlled by an electric discharge device 48. The discharge device 48 may be of any suitable type, and is shown as a triode having an anode 49, a control electrode 50, a cathode 51, and a heater filament 52. The energizing circuit for relay winding 46 may be traced from the left end of transformer secondary winding 39, through relay winding 46 in parallel with a condenser 53, anode 49, cathode 51, and conductor 44 to tap 45 of winding 39. The last described circuit will be hereinafter termed the output circuit of the discharge device 48. Control electrode 50 is connected to the common terminal of resistor 43 and winding 37 through a protective resistor 54. The circuit previously traced through winding 37 will be hereinafter termed the input circuit of the discharge device 48. Heater filament 52 may be energized from any suitable source (not shown).

When the thermocouple 2 is intact, the circuit through secondary winding 11 is complete, and hence the impedance of primary winding 37 is relatively low. The potential drop across the terminal of winding 37 then has a value such that control electrode 50 is not sufficiently negative with respect to cathode 51, during the half cycle of the alternating voltage supply conductors when the anode 49 of valve 48 is positive, to cut off the flow of current through the output circuit of the discharge device 48, and relay winding 46 is therefore energized. Upon open circuiting of thermocouple 2, however, the circuit through the transformer secondary winding 11 is opened, and the impedance of primary winding 37 accordingly becomes relatively high. The potential of control electrode 50 is thereby rendered more negative with respect to cathode 51, during the half cycle of the voltage supply means when anode 49 is positive, and the flow of current through the output circuit of discharge device 48 is cut off.

The tuning condenser 38 is provided to intensify this effect. The capacitance of this condenser is adjusted to such a value that, when the secondary circuit of transformer 12 is open, the condenser 38 and winding 37 form a parallel resonant circuit having substantially infinite impedance to current flow of the impressed frequency. The grid-cathode potential, under such conditions, is substantially the full potential between the tap 45, and the right-hand, or negative, terminal of secondary winding 39. When the secondary circuit of transformer 12 is closed, its primary winding 37 has a different value of effective impedance, and hence the circuit is no longer resonant at the impressed frequency, and the potential drop across winding 37 is relatively low.

As will be apparent to those skilled in the art, the impedances of resistor 43, condenser 38, and winding 37 may be adjusted so that the circuit will be resonant when a certain value of resistance exists in the secondary circuit of transformer 12. This critical resistance value may be chosen so that when the thermocouple resistance exceeds its maximum safe value, the relay will immediately be deenergized. The device thus may be made sensitive to incipient thermocouple failures.

Relay 47 includes the winding 46, the switches 169 and 171 and the switch arm 28 which cooperates with the front contact 27 and a back contact 55. When the relay winding 46 is energized, switch arm 28 is in engagement with the front contact 27, closing the circuits previously described through the windings of motor 10, switch 169 is closed and switch 171 is open. When the relay winding 46 is deenergized, switch 169 is opened, switch 171 is closed and switch arm 28 engages the back contact 55, completing a circuit which may be traced from line L² through conductor 42, conductor 56, an audible signalling means 57 in parallel with a visual signalling means 58, contact 55, switch arm 28, and conductor 29 to line L¹. The effect of opening switch 169 and closing switch 171 is to open the circuit of the winding of motor 35 which operates the latter in the direction to increase the supply of electrical current to resistor R and to close a circuit to the other winding of motor 35 independent of the switch 160. Motor 35 then operates to reduce the supply of electrical current to the resistor R, and thereby prevents the establishment of an excessive temperature condition within the furnace 1 upon failure of thermocouple 2. Therefore, it may be seen that relay 47 operates in response to failure of thermocouple 2 to deenergize the motor 10, to operate the motor 35 in a safe sense, and to energize the signals 57 and 58. Other switch arms, may be provided on relay 47, if desired, to operate any other apparatus found necessary or desirable.

Figure 2:
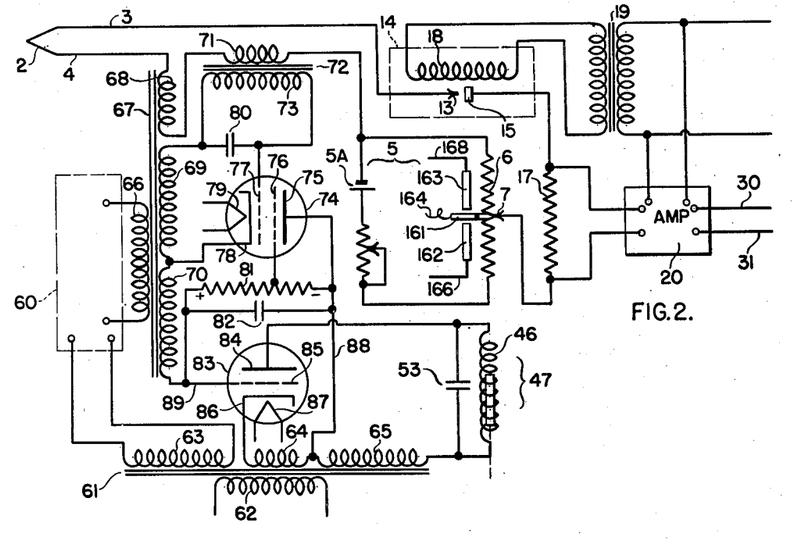
Figs. 2, 3, 4, 5 and 6 are wiring diagrams illustrating modifications of my supervisory control system which may be used in measuring and control systems similar to that of Fig. 1.

In Fig. 2 I have illustrated a modification of my invention in which means are provided to prevent any undesirable reaction of the converter 14 to the alternating current introduced in the potentiometer circuit by the winding 11 of the Fig. 1 arrangement. In the Fig. 1 arrangement, the frequency of the alternating current supplied by the winding 11 is the same as the frequency of operation of the interrupter 14. The phase relations of these two effects may be such as to produce a driving torque on the motor 10 when the potentiometer circuit is balanced. This undesirable condition is avoided in the Fig. 2 arrangement by employing a frequency converter 60 for introducing a supervisory alternating current of a frequency which is appreciably greater than the frequency of interruption of the interrupter 14 into the potentiometric network. Fig. 2 also illustrates means for introducing the supervisory alternating current into the potentiometer circuit which are separate from the means used to measure the impedance of said circuit. This provides a more flexible circuit in that it is possible to change one of these elements, if found desirable, without disturbing the other. In Fig. 1, both of these functions are performed by the transformer 12, while in Fig. 2 separate circuit elements are used. Parts in Fig. 2 which are the equivalent of corresponding parts in Fig. 1 have been given the same reference numerals.

The transformer 40 of Fig. 1 has been replaced in the Fig. 2 arrangement by a transformer 61 having a primary winding 62 and secondary windings 63, 64 and 65. Secondary winding 63 supplies power to the frequency converter 60 which changes the frequency from that of the alternating current supply lines L¹ and L² to any other desired frequency, preferably a higher frequency. The output circuit of the frequency converter 60 is connected to a primary winding 66 of another transformer 67 having secondary windings 68, 69 and 70.

Secondary winding 68 of transformer 67 is connected in conductor 4 and serves to introduce a high frequency alternating potential into the potentiometer circuit. The magnitude of the high frequency current flowing in that circuit, and hence the circuit impedance, is measured by passing the current through a primary winding 71 of a transformer 72 which may conveniently be connected in the conductor 4. Both windings 68 and 71 are so designed that the alternating currents flowing in them are small whereby their effect on the operation and calibration of the measuring circuit is negligible. The transformer 72 has a secondary winding 73 which is connected in the input circuit of an electric discharge device 74. The latter may be of any convenient type, and is shown as a tetrode comprising an anode 75, a screen electrode 76, a control electrode 77, a cathode 78, and a heater filament 79. The input circuit of discharge device 74 may be traced from cathode 78 through secondary winding 69 of transformer 67 and secondary winding 73 of transformer 72 in parallel with a condenser 80 to control electrode 77. The secondary winding 69 is connected with its polarity such that it biases control electrode 77 negatively with respect to cathode 78, during the half cycles when anode 75 is positive. The secondary winding 73 of transformer 72 is connected with its polarity opposing that of secondary winding 69. When the potentiometer circuit is complete, the high frequency current flowing through primary winding 71 of transformer 72 induces a potential in secondary winding 73. This effectively opposes the biasing potential of winding 69 so that the control electrode 77 is at nearly the same potential as cathode 78, and the output circuit of discharge device 74 is therefore conductive. When the potentiometer circuit is incomplete, however, due to thermocouple failure, no potential is induced in the secondary winding 73, and the biasing potential of winding 69 is effective to render the discharge device 74 non-conductive. The function of condenser 80 is identical with that of condenser 38 in the Fig. 1 arrangement. The output circuit of discharge device 74 may be traced from cathode 78 through transformer secondary winding 70, and a resistor 81 in parallel with a condenser 82, to anode 75. Condenser 82 tends to smooth the pulsating output current of discharge device 74 and produce a relatively steady potential drop of the polarity indicated in the drawing across the resistor 81. The screen electrode 76 is connected to a tap located at the proper point on resistor 81 to provide electrode 76 with the correct operating potential. Thus, it is seen that a potential is produced across resistor 81 when the potentiometer circuit is complete, but that the potential disappears when the potentiometer circuit is opened, as by thermocouple failure.

The potential so produced across the resistor 81 is used to control the input circuit of another electric discharge device 83, of any suitable type, which is shown as a triode having an anode 84, a control electrode 85, a cathode 86, and a heater filament 87. The input circuit of discharge device 83 may be traced from cathode 86 through secondary winding 64 of transformer 61, a conductor 88, resistor 81 and condenser 82 in parallel, and a conductor 89 to control electrode 85. Winding 64 is so connected that its polarity tends to bias the control electrode 85 negatively with respect to cathode 86 during the half cycles when anode 84 is positive with respect to cathode 86. When no potential is present across resistor 81, the biasing potential of winding 64 is effective to prevent the flow of current in the output circuit of discharge device 83. The potential across resistor 81, however, is normally effective to overcome the biasing potential of winding 64, thereby rendering the discharge device 83 conductive. The output circuit of discharge device 83 may be traced from cathode 86 through secondary windings 64 and 65 and relay winding 46 in parallel with condenser 53, to anode 84. The heater filaments 79 and 87 may be energized from any convenient source (not shown).

It may, therefore, be seen that this circuit responds in the same way as the circuit of Fig. 1 to the failure of thermocouple 2. That is to say, when the potentiometer circuit is complete, relay winding 46 is energized, and when the potentiometer circuit is opened due to thermocouple failure, or from any other cause, relay winding 46 is deenergized.

Figure 3:
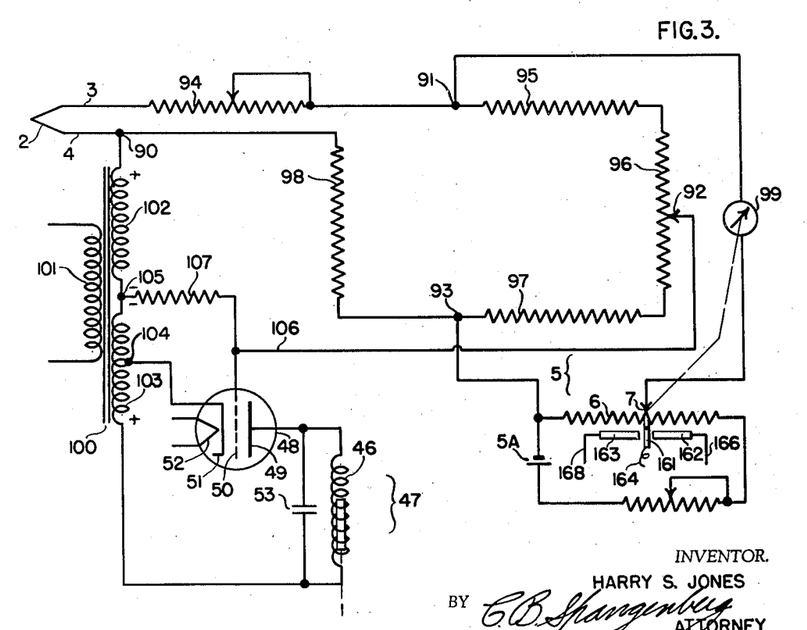

In Fig. 3 I have illustrated somewhat diagrammatically another modification of the arrangement of Fig. 1 wherein a different controlling means are employed, and wherein a bridge circuit is used to prevent undesirable alternating currents from entering the potentiometer and control circuits. Again, parts having their equivalents in Fig. 1 have been given the same reference numerals.

The bridge circuit referred to comprises four arms, connected between four terminals 90, 91, 92 and 93. The first arm of the bridge is connected between terminals 90 and 91, and comprises thermocouple 2, conductors 3 and 4, and a resistor 94, the latter being preferably adjustable to compensate for changes in the resistance of conductors 3 and 4. The second arm of the bridge is connected between terminals 91 and 92 and includes a resistor 95 and that part of a resistor 96 between one terminal thereof and an adjustable tap which serves as terminal 92. The third arm of the bridge is connected between terminals 92 and 93 and includes the remainder of resistor 96 and a resistor 97. The fourth bridge arm is connected between terminals 93 and 90 and comprises a resistor 98.

The controlling means illustrated in Fig. 3 is connected between terminal 91 and contact 7 of potentiometric network 5, and comprises a contact making galvanometer 99 of any suitable construction. The left end of slidewire 6 is connected to terminal 93 to complete the potentiometric network 5. The bridge is balanced when the thermocouple 2 is intact, so that terminals 91 and 93 are at the same potential with respect to the alternating current circuit to be described, and hence no alternating current will flow through the galvanometer and potentiometer circuit. Furthermore, terminals 90 and 92 are at the same potential with respect to the direct current measuring circuit, so that no direct current flows through the alternating current circuit. From the foregoing it will be apparent that the insertion of this bridge circuit in the conductors 3 and 4 will cause substantially no change in the calibration of the measuring circuit.

In Fig. 3, the transformer 40 of the Fig. 1 arrangement has been replaced by a transformer 100, having a primary winding 101 and secondary windings 102 and 103. The winding 103 is used to supply the output circuit of the discharge device 48, which circuit may be traced from the lower terminal of winding 103, as it appears in the drawings, through relay winding 46 in parallel with condenser 53, anode 49 and cathode 51 to a tap 104 on winding 103. The upper terminal of winding 103 is connected at 105 to the lower terminal of winding 102. The windings are connected so that the polarity of the common terminal 105 is opposite that of both the end terminals. For instance, when the common terminal 105 is negative, both the end terminals are positive, as indicated in the drawings.

In Fig. 3, the input circuit of discharge device 48 may be traced from terminal 105, through winding 102, bridge circuit terminal 90, the bridge circuit, terminal 92, a conductor 106, and a resistor 107 back to terminal 105. Cathode 51 is connected to this circuit through tap 104 and part of winding 103 to terminal 105. Control electrode 50 is connected to the conductor 106. During the half cycles when anode 49 is positive, that part of winding 103 between tap 104 and terminal 105 biases control electrode 50 negative with respect to cathode 51. When the thermocouple 2 is intact and the bridge circuit is complete, current flowing through the input circuit from winding 102 produces a potential drop across resistor 107 which effectively opposes the biasing potential of winding 103, and the output circuit of discharge device 48 is therefore rendered conductive, and relay winding 46 is energized. When thermocouple 2 fails, however, the first arm of the bridge circuit is opened, and the bridge circuit resistance is thereby increased. This reduces the potential across resistor 107, and the biasing potential of winding 103 becomes effective to cut off the flow of current in the output circuit of discharge device 48, thus deenergizing relay winding 46.

The circuit arrangement of Fig. 3 may be made sensitive to an increase in the resistance of thermocouple 2 above any desired value by properly proportioning the resistor 107, the transformer windings, and the bridge circuit resistances, and by providing a discharge device having a sharp cut-off characteristic.

Figure 4:
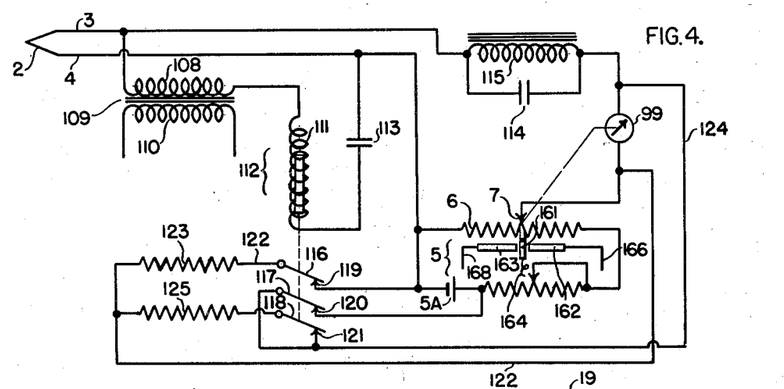

In Fig. 4 I have illustrated, more or less diagrammatically, still another modification of the arrangement of Fig. 1 wherein a different type of control is employed, and wherein filter means are used to prevent the flow of undesirable alternating currents in the measuring and controlling circuits.

In the arrangement of Fig. 4, the alternating current circuit is connected in parallel with the measuring and controlling circuits across the conductors 3 and 4. The said alternating current circuit may be traced from conductor 3, through a secondary winding 108 of a transformer 109 having a primary winding 110, a winding 111 of a relay 112, a condenser 113, conductor 4, and thermocouple 2 back to conductor 3. The condenser 113 is provided to prevent the flow of direct current through this alternating current circuit, and consequent disturbance of the calibration of the measuring and control circuits. A condenser 114 and a choke coil 115, connected in parallel, are inserted in the conductor 3 between the alternating current circuit connection and the measuring and controlling circuit. The impedances of condenser 114 and coil 115 are of such value that they form a parallel resonant circuit which presents infinite impedance to the flow of alternating current of the frequency supplied by transformer 109. The alternating current is therefore substantially completely blocked out of the measuring and controlling circuits.

When the thermocouple 2 is intact, the relay 112 receives energizing current through a circuit including the thermocouple. Upon thermocouple failure, however, relay 112 is deenergized and operates to impress across the contact-making galvanometer 99 a potential of such polarity as to simulate a rise in temperature at thermocouple 2. Relay 112 includes the winding 111 and switch arms 116, 117 and 118, cooperating respectively with back contacts 119, 120 and 121. A back contact of a relay may be defined as one through which a circuit is closed when the relay winding is deenergized.

When the relay 112 is deenergized, a circuit is completed which may be traced from one terminal of a battery 5A in the potentiometric network 5 to contact 119, switch arm 116, a conductor 122, in which a current limiting resistance 123 is inserted, to galvanometer 99, a conductor 124, switch arm 117, and contact 120 to the opposite terminal of battery 5A. Closing of this circuit applies a potential to the galvanometer 99 of polarity opposite to that supplied by battery 5A through the normal potentiometric circuit and, therefore, produces the same effect on the control circuit as is produced thereon by a rise in temperature at thermocouple 2, namely, a reduction on the supply of heating agent to the furnace. As illustrated, deenergization of the relay 112 also effects the closure of a shunt or damping circuit about the galvanometer 99 through a resistance 125. This circuit may be traced from the upper terminal of galvanometer 99 through conductor 124, contact 121, switch arm 118, resistance 125 and conductor 122 to the lower terminal of galvanometer 99.

As will be apparent to those skilled in the art, the control means of Fig. 4 and the control means of Fig. 1 may be interchanged, if desired. That is to say, the contacting galvanometer of Fig. 4 is the equivalent of the converter and amplifier means of Fig. 1. Likewise, each arrangement may utilize its relay contacts either to discontinue the control and operate a signal or to apply a potential to the control circuit so as to cause discontinuance of the heat supply.

Figure 5:
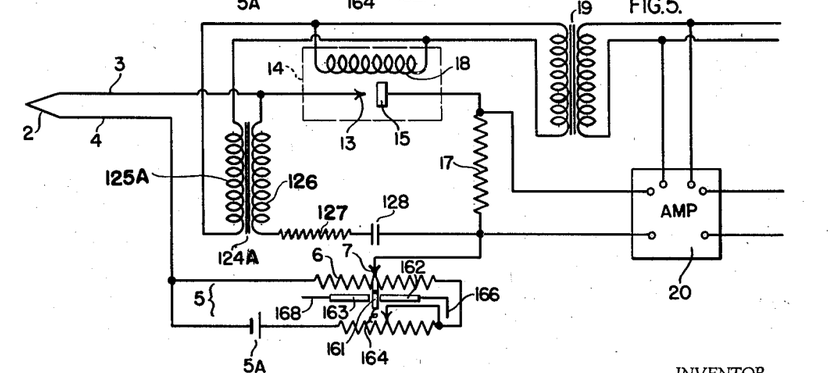

In Fig. 5 I have shown a further modification of the Fig. 1 arrangement wherein the use of a relay may be dispensed with. In this circuit, thermocouple failure causes a change in phase of the alternating potential in the thermocouple circuit, and this phase change is utilized to apply directly to the amplifier 20 a potential simulating a rise in thermocouple temperature.

In Fig. 5 an alternating potential is applied to the thermocouple circuit by a transformer 124A having a primary winding 125A and a secondary winding 126. The current produced by this alternating potential normally flows through a circuit which may be traced from conductor 3, through transformer secondary winding 126, a resistor 127, a condenser 128, contact 7, slidewire 6, conductor 4, and thermocouple 2 back to conductor 3. It is noted the slidewire 6 and thermocouple 2 are shunted by the resistor 17 and the interrupter 14. The resistance of this latter connection including resistor 17 and interrupter 14 is considerably higher than that of slidewire 6 and thermocouple 2, and therefore, relatively little alternating current flows through said latter connection. The capacitance of condenser 128 and the resistance of resistance 127 are so selected that the alternating current flowing through them is substantially 90° out of phase with the supply line current.

It will accordingly be apparent that the alternating current flowing through the thermocouple 2 does not normally produce in the input circuit of amplifier 20 an impulse which is effective to drive motor 10, since the portion of the alternating current flowing through resistance 17 is very small normally and, moreover, its phase is such as to render it ineffective.

When the thermocouple 2 fails, however, the circuit through the thermocouple shunting resistor 17 and converter 14 is opened, and the alternating current flowing through the latter elements is thereby greatly increased. At the same time, the resistance in circuit with condenser 128 is increased which resistance increase effects a change in phase of the current in the direction to make the latter more nearly in phase with the supply line voltage. The net effect of these changes is to produce a potential drop across resistor 17, which, acting through the amplifier 20, is effective to drive the motor 10 and thereby the motor 35 in the proper direction to shut off the supply of heat to furnace 1.

The condenser 128 is also effective in this circuit to prevent the flow of direct current through winding 126 and resistor 17, so that the calibration, or the sensitivity, of the measuring circuit will not be disturbed by the addition of the supervisory control device to it.

Figure 6:
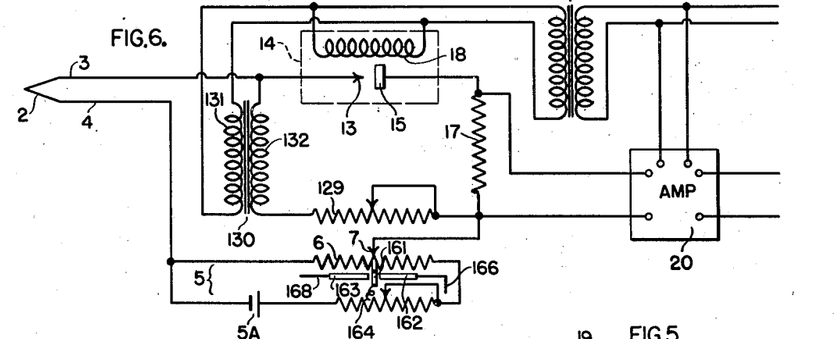

In Fig. 6 I have illustrated more or less diagrammatically another modification of the Fig. 1 arrangement wherein the use of a relay may be dispensed with. In this circuit thermocouple failure causes the application of an alternating potential on the input circuit of amplifier 20 which potential is normally compensated for and is of the phase to cause the amplifier 20 to drive the motor 10 and thereby the motor 35 in the proper direction to shut off the control.

In Fig. 6 an alternating potential is applied to the thermocouple circuit by a transformer 130 having a primary winding 131 and a secondary winding 132. The current produced by this alternating potential normally flows through a circuit which may be traced from conductor 3, through transformer secondary winding 132, a resistor 129, contact 7, slidewire 6, conductor 4 and thermocouple 2 back to conductor 3. In this arrangement as in the Fig. 5 arrangement, the slidewire 6 and thermocouple 2 are shunted by the resistor 17 and the interrupter 14. The resistance of the resistor 17 and interrupter 14 is considerably higher than that of slidewire 6 and thermocouple 2, and therefore relatively little alternating current flows through said resistor 17 and interrupter 14. Thus, when the thermocouple 2 is intact the alternating potential applied to the circuit by the transformer secondary winding 132 is ineffective to actuate the motor 10 and thereby motor 35 for rotation.

Upon failure of the thermocouple 2, however, the low resistance shunt about the terminals of the transformer secondary winding 132 and resistance 129 is open circuited, and accordingly an increased flow of alternating current is produced through the resistance 17 and interrupter 14. This alternating current flow is of the correct phase to effect actuation of the pen 32 upscale and thereby to cause the reversible motor 35 to cut off the supply of heating agent to the furnace 1.

Figure 7:
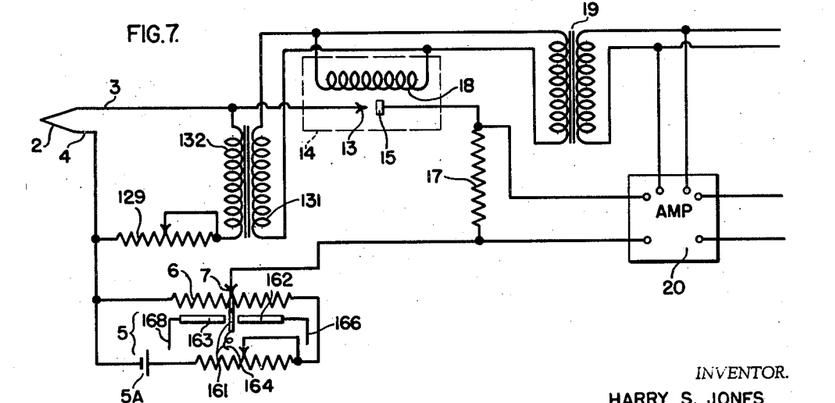
Fig. 7 is a wiring diagram illustrating a modification of Fig. 6.

In Fig. 7 I have illustrated more or less diagrammatically a modification of the Fig. 6 arrangement in which the transformer secondary winding 132 and resistance 129 are connected directly between the conductors 3 and 4. In this circuit the alternating potential applied to the potentiometric circuit normally tends to produce a motor energizing effect in the proper direction to drive the pen 32 upscale but this energizing effect is compensated for by the direct current flow from the thermocouple through the transformer secondary winding 132 and resistance 129. Therefore, as long as the thermocouple 2 is intact, the alternating potential applied to the thermocouple circuit is ineffective to cause actuation of the motor 10 and thereby motor 35, but upon failure of the thermocouple 2, said alternating potential effects actuation of said motors in the proper direction to cut off the supply of heat to furnace 1.

While in accordance with the provisions of the statutes I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent, is:

1. A control system including in combination, a normally balanced electrical network, a thermocouple exposed to a temperature to be controlled connected in said network, said thermocouple being operative to control the state of balance of said network, means to control said temperature and responsive to state of balance of said network, a connection between said control means and said network, means to apply an alternating potential across said thermocouple, and means responsive to the flow of alternating current through said thermocouple to continuously control said connection.

2. A control system including in combination an electrical network, means responsive to a condition and tending to unbalance said network, means continuously responsive to the state of unbalance of said network to rebalance said network, a connection between said last-named means and said network, means to apply an alternating potential across said condition-responsive means, and means continuously responsive to the flow of alternating current through said condition-responsive means to control said connection.

3. In a control system having a thermocouple responsive to a temperature condition to produce an electromotive force variable in accordance with said temperature condition, means to continuously detect failure of said thermocouple comprising a transformer having a pair of windings in inductive relation, one of said windings being connected in series with said thermocouple, a source of alternating current, relay means, a circuit including said relay means, said source of alternating current and the other winding of said transformer, and a signal controlled by said relay means to indicate failure of said thermocouple.

4. The combination of claim 3 wherein the electromotive force produced by said thermocouple is opposed to a known electromotive force and including means for translating the difference between said electromotive forces into an alternating current of the same frequency as that of said alternating current source, and means controlled by said alternating current to indicate the magnitude of said condition.

5. The combination of claim 3 wherein the electromotive force produced by said thermocouple is opposed to a known electromotive force and including means for translating the difference between said electromotive forces into an alternating current of regular frequency but of frequency different from the frequency of said alternating current source, and means controlled by said alternating current to indicate the magnitude of said condition.

6. In a control system having a thermocouple responsive to a temperature condition to produce an electromotive force variable in accordance with said temperature condition, means to continuously detect failure of said thermocouple comprising a transformer having a pair of windings in inductive relation, one of said windings being connected in parallel with said thermocouple, a source of alternating current, relay means, a circuit including said relay means, said source of alternating current and the other winding of said transformer, and a signal controlled by said relay means to indicate failure of said thermocouple.

7. In a control system having a thermocouple responsive to a temperature condition to produce an electromotive force variable in accordance with said temperature condition, means to continuously detect failure of said thermocouple comprising a source of alternating current, a transformer having a pair of windings in inductive relation, one of said windings being connected in series with said thermocouple and said source of alternating current, an electronic valve having an input circuit and an output circuit, a connection between the other winding of said transformer and the input circuit of said valve, a source of energizing current for the output circuit of said valve, relay means, a circuit including said relay means, said second mentioned source of current, and the output circuit of said valve, and a signal controlled by said relay means to indicate failure of said thermocouple.

8. In a control system having a thermocouple responsive to a temperature condition to produce an electromotive force variable in accordance with said temperature condition, means to continuously detect failure of said thermocouple comprising a resistance, a condenser, a transformer having a pair of windings in inductive relation, one of said windings being connected in parallel with said thermocouple through said resistance and condenser, a source of alternating current, relay means, a circuit including said relay means, said source of alternating current and the other winding of said transformer, and a signal controlled by said relay means to indicate failure of said thermocouple.

HARRY S. JONES.